United States Patent [19]
Iwashita et al.

[11] Patent Number: 5,936,369
[45] Date of Patent: Aug. 10, 1999

[54] METHOD OF ESTIMATING DISTURBANCE LOAD ON SERVOMOTOR

[75] Inventors: Yasusuke Iwashita, Oshino-mura; Hiroyuki Kawamura, Minamitsuru-gun, both of Japan

[73] Assignee: Fanuc, Ltd, Minamitsuru, Japan

[21] Appl. No.: 08/875,422

[22] PCT Filed: Nov. 27, 1996

[86] PCT No.: PCT/JP96/03474

§ 371 Date: Jul. 28, 1997

§ 102(e) Date: Jul. 28, 1997

[87] PCT Pub. No.: WO97/20260

PCT Pub. Date: Jun. 5, 1997

[30] Foreign Application Priority Data

Nov. 28, 1995 [JP] Japan .................................. 7-331213

[51] Int. Cl.⁶ ............................ G05D 3/00; G05D 3/12
[52] U.S. Cl. .......................................... 318/609; 318/610
[58] Field of Search .................... 318/560–696; 364/140–169, 474.17; 73/862.193, 862.191, 104

[56] References Cited

U.S. PATENT DOCUMENTS

| | | | |
|---|---|---|---|
| 4,943,759 | 7/1990 | Sakamoto et al. | 318/568.11 |
| 5,135,186 | 8/1992 | Ako | 244/75 A |
| 5,239,248 | 8/1993 | Shimada et al. | 318/568.12 |
| 5,371,449 | 12/1994 | Tajima et al. | 318/560 |
| 5,402,400 | 3/1995 | Hamada et al. | 369/32 |
| 5,406,182 | 4/1995 | Iwashita . | |
| 5,448,145 | 9/1995 | Iwashita . | |
| 5,448,147 | 9/1995 | Kasai | 318/568.17 |
| 5,467,001 | 11/1995 | Iwashita . | |
| 5,467,004 | 11/1995 | Matsuo et al. | 318/807 |
| 5,493,192 | 2/1996 | Nihei et al. | 318/568.2 |
| 5,517,100 | 5/1996 | Matsubara et al. . | |
| 5,587,915 | 12/1996 | Nagatomi | 364/474.19 |
| 5,589,086 | 12/1996 | Sawada et al. . | |
| 5,598,077 | 1/1997 | Matsubara et al. | 318/568.22 |
| 5,602,347 | 2/1997 | Matsubara et al. | 73/862.193 |
| 5,637,969 | 6/1997 | Kato et al. . | |
| 5,691,615 | 11/1997 | Kato et al. . | |
| 5,710,500 | 1/1998 | Matsuo et al. | 318/799 |

FOREIGN PATENT DOCUMENTS

| | | |
|---|---|---|
| 0 649 704 | 4/1995 | European Pat. Off. . |
| 0 666 138 | 8/1995 | European Pat. Off. . |
| 0 666 642 | 8/1995 | European Pat. Off. . |
| 0 680 800 | 11/1995 | European Pat. Off. . |
| 2-10411 | 1/1990 | Japan . |
| 2-123984 | 5/1990 | Japan . |
| 2-136906 | 5/1990 | Japan . |
| 4-64898 | 2/1992 | Japan . |
| 4-238508 | 8/1992 | Japan . |
| 7-31174 | 1/1995 | Japan . |
| 7-327382 | 12/1995 | Japan . |

*Primary Examiner*—Paul Ip
*Attorney, Agent, or Firm*—Staas & Halsey

[57] ABSTRACT

A disturbance load estimation method for a servomotor in which an disturbance load externally exerted on the servomotor can be accurately estimated even when the voltage is saturated. Actual values ($I_r$, $I_s$, $I_t$) of three-phase alternating current determined by current loop processing (term 1) are converted by DQ conversion, and an effective current component ($I_q$) that contributes to a torque generated by the servomotor is obtained (term 4). Based on the obtained effective current component, a motor acceleration is estimated (term 5), a difference between the estimated acceleration and an actual motor acceleration (term 6) is obtained, and the disturbance load is estimated based on the acceleration difference (term 7).

3 Claims, 7 Drawing Sheets

METHOD OF ESTIMATING DISTURBANCE LOAD ON SERVOMOTOR

This application is a 371 of PCT/JP96/03474 filed on Nov. 27, 1996.

TECHNICAL FIELD

The present invention relates to a method of estimating a disturbance load externally exerted on a servomotor for driving a feed shaft of a machine tool, a robot arm, etc.

BACKGROUND ART

In a control system of a servomotor for driving a feed shaft of a machine tool, a robot arm, etc., there is known a method of preventing damage to a mechanical system by estimating a force externally exerted on the servomotor by a disturbance estimation observer to monitor the estimated value. FIGS. 5a and 5b (PRIOR ART) are block diagrams illustrating a principle of the conventional disturbance load estimation method. In FIG. 5a, a servomotor 10 receives a torque command (current command) Tc outputted from a control system which performs a proportional control with respect to position and a proportional-plus-integral control with respect to speed, and outputs an actual torque T. A movement of a movable member such as a feed shaft of a machine tool, a robot arm, etc, which is driven by the servomotor, is sometimes hindered for some reason such that the driven member collides with some other object and the tool is excessively pressed against a workpiece. Such a condition is equivalent to an occurrence of an external disturbance load torque Td exerted on the motor 10. Conventionally, a difference between an acceleration estimated based on the torque command Tc and an actual acceleration detected by a speed detector mounted on the motor 10 is obtained at a term 11, and this acceleration difference is converted into a torque value as an estimated disturbance load torque Td* at a torque conversion term 12.

FIG. 6A (PRIOR ART) is a block diagram of a conventional control system for obtaining an estimated disturbance load torque, and illustrates the case where the disturbance load is estimated by the acceleration comparison. In FIG. 6A, the servomotor control system is expressed by a term 8 for speed loop processing, a term 1 for current loop processing, and terms 2 and 3 for the transfer function of the servomotor 10, and an observer 40 for obtaining the estimated disturbance load torque Td* is expressed by terms 5, 6 and 7. The term 5 is a term for multiplying an actual current Ic to be supplied to the servomotor by a parameter $\alpha$ (quotient obtained by dividing a torque constant Kt of the motor by inertia Jm), the term 6 is a differential term for differentiating an actual speed v, and the term 7 is a term to be multiplied by a parameter $1/\alpha$.

FIG. 6B (PRIOR ART) is a block diagram of a conventional system which embodies components of a control system for a machine tool. As illustrated, control apparatus 30 represents a control apparatus such as a numerical control apparatus (CNC) to control a machine tool. Control instructions are transferred between common memory 32 and then transferred between digital servo circuit 34. Digital servo circuit 34 includes a CPU for executing position, speed, and current control processing and outputs a torque command, i.e. current command. The torque command is amplified by servo amplifier 36 and then transferred to motor 38. Pulse coder 40 generates a predetermined number of feedback pulses per revolution of motor 38 to thereby feedback position and speed information to digital servo circuit 34.

In the servomotor control system shown in FIG. 6A, the torque command (current command) Tc is obtained at the term 8 for speed loop processing. At the term 1 for current loop processing, a voltage command is obtained based on the torque command Tc, and an actual current Ic corresponding to the voltage command is supplied to the servomotor, to thereby drive the servomotor. The observer 40 for estimating the disturbance load torque Tc obtains a difference between the value (Ic·$\alpha$) which is obtained at the term 5 by multiplying the actual current Ic by the parameter $\alpha$, and the value dv/dt which is obtained at the term 6 by differentiating the actual speed v of the motor, and this difference {(Ic·$\alpha$)−dv/dt} is multiplied by the parameter $1/\alpha$. The resultant value (Ic−dv/dt·Jm/Kt) represents the estimated value Td* of disturbance load torque Td in terms of current.

According to the conventional disturbance load estimation for a servomotor, a disturbance load value can be accurately estimated when the torque command and the torque actually output from the servomotor are correspondent to each other. However, in the case where the torque is not output according to the torque command due to voltage saturation etc., the disturbance load cannot be estimated with accuracy.

FIG. 7 is a diagram showing a servomotor voltage state during high-speed rotation. In FIG. 7, the voltage state is expressed in a direct-current coordinate system, wherein the horizontal axis indicates a q-phase voltage which contributes to the torque actually generated by the servomotor, the vertical axis indicates a d-phase voltage which does not contribute to the torque actually generated by the motor, and the circle indicates the DC linkage voltage of a servo amplifier. The servo amplifier supplies the motor with a driving current I corresponding to a current command Ic input thereto, to thereby drive the motor. The voltage that the servo amplifier can apply is, however, limited to the DC linkage voltage, and the servo amplifier cannot apply a voltage higher than the DC linkage voltage to the motor. In general, a counterelectromotive voltage E develops with rotation of the motor, and the terminal voltage of the motor is equal to the sum of the counterelectromotive voltage E and a voltage required for motor acceleration corresponding to the current command Ic.

The counterelectromotive voltage E rises with increase in the rotational speed of the motor, and in some cases the sum of the counterelectromotive voltage E and the voltage generated in accordance with the current command Ic exceeds the DC linkage voltage. In such cases, the driving current I for driving the motor is not able to develop a voltage corresponding to the current command Ic, causing the motor to become unable to develop the torque equivalent to the current value (Ic-I), with the result that torque as demanded by the torque command cannot be output.

In such a case, if the disturbance load is estimated by the conventional disturbance load estimation method, then the estimated disturbance load value includes not only the disturbance load that should primarily be estimated but also a torque difference between the commanded torque and the actual torque, making the estimation of the disturbance load inaccurate. FIG. 5b shows the state in which the estimation by the conventional disturbance load estimation for a servomotor involves an error due to a torque difference induced by current saturation. In FIG. 5b, a difference between the acceleration estimated based on the torque command Tc and the actual acceleration detected by the speed detector mounted on the motor 10 is obtained at the term 11, and this acceleration difference is converted into a torque value as the estimated disturbance load torque Td* at the torque conversion term 12. The estimated disturbance load torque Td* obtained in this manner includes, besides the disturbance load torque Td that should primarily be estimated, a difference (Tc−T) between the torque by the torque command Tc and the actual torque T caused by voltage saturation etc. This torque difference (Tc−T) corresponds to an error in the estimated disturbance load.

DISCLOSURE OF THE INVENTION

An object of the present invention is to provide a disturbance load estimation method for a servomotor, which is capable of accurately estimating an external disturbance load exerted on the motor even when the voltage is saturated.

The disturbance load estimation method according to the present invention comprises the steps of obtaining an effective current component which contributes to a torque generated by the servomotor in the actual current determined by current loop processing; inputting the effective current component to a disturbance estimation observer; and estimating a disturbance load on the servomotor by the disturbance estimation observer based on the effective current component.

The disturbance estimation observer estimates a servomotor acceleration based on the effective current component, obtains a difference between the estimated acceleration and an actual acceleration of the motor, and estimates the disturbance load based on the acceleration difference. Alternatively, the disturbance estimation observer may estimate a servomotor speed based on the effective current component, obtain a difference between the estimated speed and an actual speed of the servomotor, and estimate the disturbance load based on the speed difference.

The effective current that contributes to the torque generated by the servomotor can be obtained by converting the actual values of three-phase alternating current determined by the current loop processing into the value of two-phase direct current by DQ conversion. The DQ conversion is for converting a three-phase current into a two-phase, namely d- and q-phase currents which can be expressed in an orthogonal direct-current coordinate system. In the two-phase control of servomotor using the DQ conversion, the effective current can be controlled through only one phase of direct current by making the two-phase direct-current coordinate system coincide with the axis of the rotor, and this direct current constitutes the effective current flowing through the motor. Therefore, according to the present invention, the acceleration or speed commanded for the servomotor is estimated by means of the effective current obtained by the DQ conversion, a difference between the estimated value and an actual acceleration or speed of the motor is obtained, and a disturbance load, free of an error attributable to voltage saturation, is estimated.

With the configuration described above, even in the case where there arises a difference between the command for current and the torque command for the servomotor due to voltage saturation caused by high-speed rotation, an acceleration or speed which is based on the torque actually generated by the motor is estimated by means of the effective current, and the difference between the estimated acceleration or speed and an actual acceleration or speed of the motor does not include an error attributable to voltage saturation. Thus, it is possible to accurately estimate the external disturbance load exerted on the servomotor.

BEST MODE OF CARRYING OUT THE INVENTION

First, referring to FIG. 1, an embodiment of the invention will be described with respect to a disturbance load estimating observer for estimating the disturbance load based on the difference between an estimated acceleration and an actual acceleration.

Figure 1:
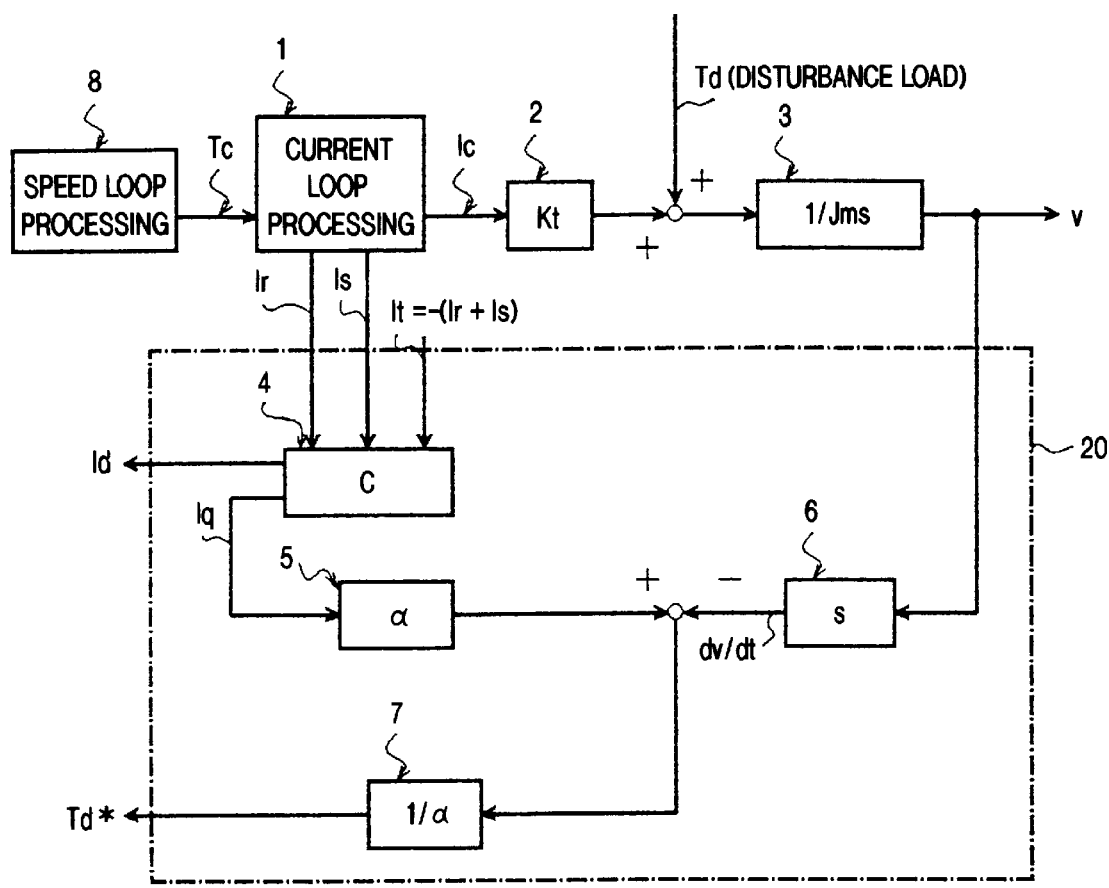
FIG. 1 is a schematic block diagram of a control system provided with a disturbance estimation observer according to a first embodiment of the present invention.

FIG. 1 is a schematic block diagram illustrating a method of estimating a disturbance load torque according to the present invention. In the block diagram of FIG. 1, a disturbance estimation observer 20 for estimating a disturbance load torque is applied to a servomotor control system in which a proportional control is performed for position and proportional-plus-integral control is performed for speed. As shown in FIG. 1, the control system of a servomotor is represented by a term 8 for speed loop processing, a term 1 for current loop, and terms 2 and 3 for the transfer function of the motor, while the observer 20 for obtaining an estimated disturbance load torque Td* is represented by terms 4, 5, 6 and 7. Symbol Kt of the term 2 denotes the torque constant of the motor, Jm of the term 3 denotes the inertia of the motor, and s is the Laplace operator. The term 4 represents a DQ conversion term for converting a three-phase alternating current to a two-phase direct current, and the transformation matrix thereof is indicated by determinant C below. In the following expression, Δe represents the electrical angle of the motor.

$$C = \sqrt{2/3} \cdot \begin{pmatrix} \cos\theta e & \sin\theta e \\ -\sin\theta e & \cos\theta e \end{pmatrix} \cdot \begin{pmatrix} 1 & -1/2 & 1/2 \\ 0 & \sqrt{3/2} & -\sqrt{3/2} \end{pmatrix}. \tag{1}$$

The term 5 is a term for multiplying a value Iq, which is obtained by subjecting the actual current Ic to DC conversion, by a parameter α (value obtained by dividing the motor torque constant Kt by the inertia Jm), the term 6 is a differential term for differentiating the actual speed v, and the term 7 is a term for performing multiplication using a parameter 1/α.

The term 1 for current loop processing receives a torque command (current command) Tc from the term 8 for speed loop processing, and determines an actual current Ic to be supplied to the individual phases in accordance with the torque command Tc and a signal fed back from the servomotor. In the estimation method according to the present invention, current values Ir, Is and It of the three-phase current constituting the actual current Ic are converted into values Iq and Id of two-phase direct current at the DQ conversion term 5. The current values Ir, Is and It of the three-phase current have a relationship of Ir+Is+It=0, and, therefore, by using the current values of any two of the three phases, it is possible to obtain the current value of the remaining phase. FIG. 1 illustrates the case where the current values Ir and Is are obtained from the outputs of the term 1 of current loop processing and the remaining current value It is obtained by calculation, but another combinations of current values are also possible.

According to this embodiment, of the two current values Iq and Id of the two-phase direct current calculated by using the determinant C, the q-phase current, which is an effective current that contributes to torque to be actually generated by the motor, is used to estimate the acceleration. An acceleration can be estimated by multiplying the q-phase current Iq by the parameter α. The parameter α may be a value obtained by dividing the motor torque constant Kt by the inertia Jm.

Figure 6A:
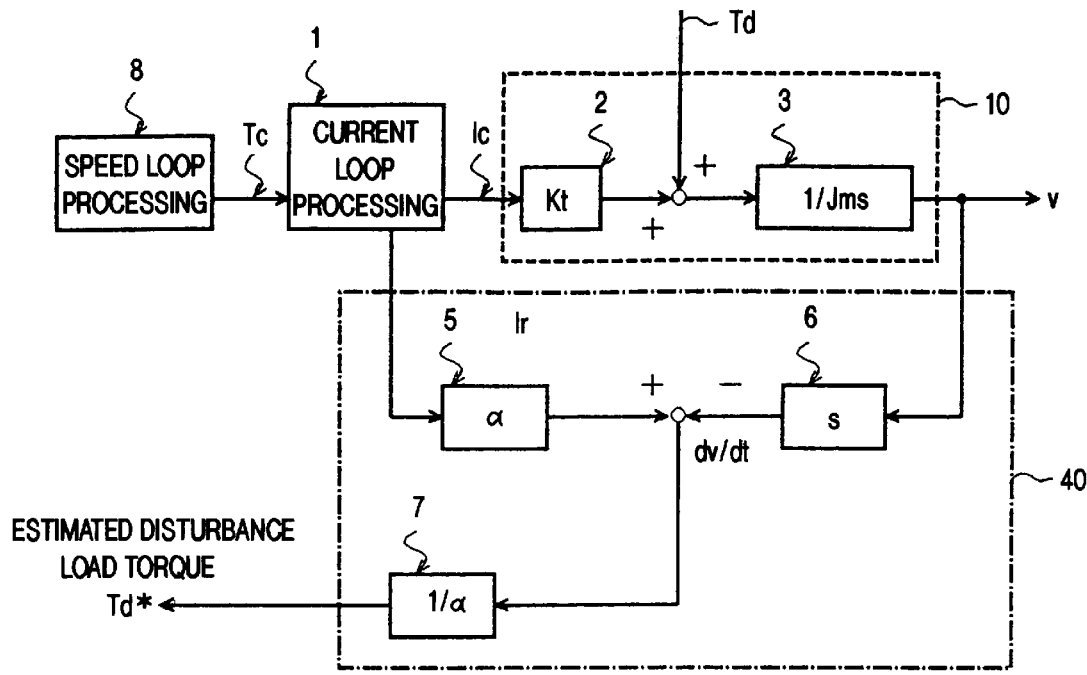
FIG. 6A (PRIOR ART) is a block diagram of a servo control system provided with a conventional disturbance estimation observer.
Figure 6B:
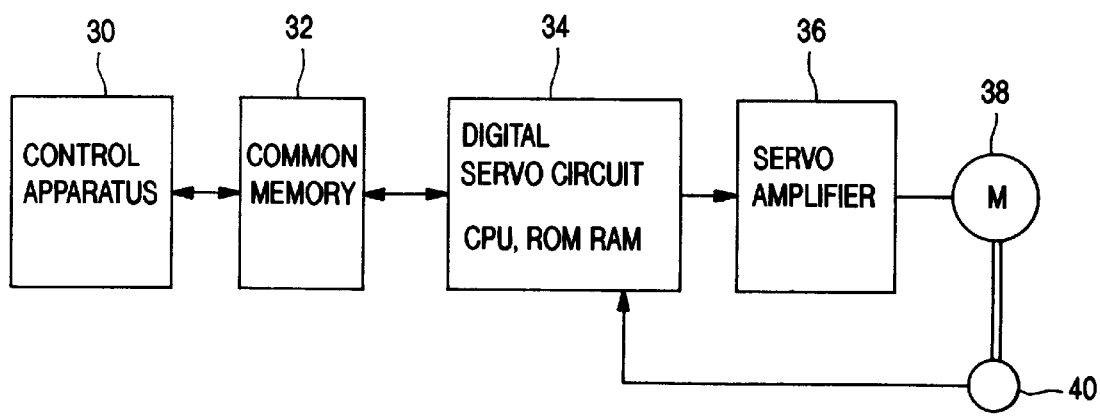
FIG. 6B (PRIOR ART) is a block diagram of a conventional system which embodies components of a control system for a machine tool.

On the other hand, based on the motor speed v detected by a speed detector (not shown in FIG. 1) mounted on the motor, an actual acceleration of the motor is obtained. The speed detector may take the form of pulse coder 40 of FIG. 6B. The actual acceleration of the motor can be derived as dv/dt, which is a differential of the motor speed v.

Then, the difference between the acceleration α·Iq estimated based on the current command and the actual acceleration dv/dt is obtained. This acceleration difference is given as $$\alpha \cdot Iq - dv/dt = (Kt/Jm) \cdot Iq - dv/dt, \quad (2)$$

and this difference is multiplied by the reciprocal of the parameter α, that is, 1/α=Jm/Kt to obtain estimated disturbance load Td*, which is a disturbance load Td expressed in the unit of current.

$$Td^* = (Jm/Kt) \cdot \{(Kt/Jm) \cdot Iq - dv/dt\} \quad (3)$$
$$= Iq - (Jm/Kt) \cdot (dv/dt)$$

The above equation for deriving the estimated disturbance load Td* does not include the reactive current Id, so that the influence of voltage saturation can be eliminated.

Figure 2:
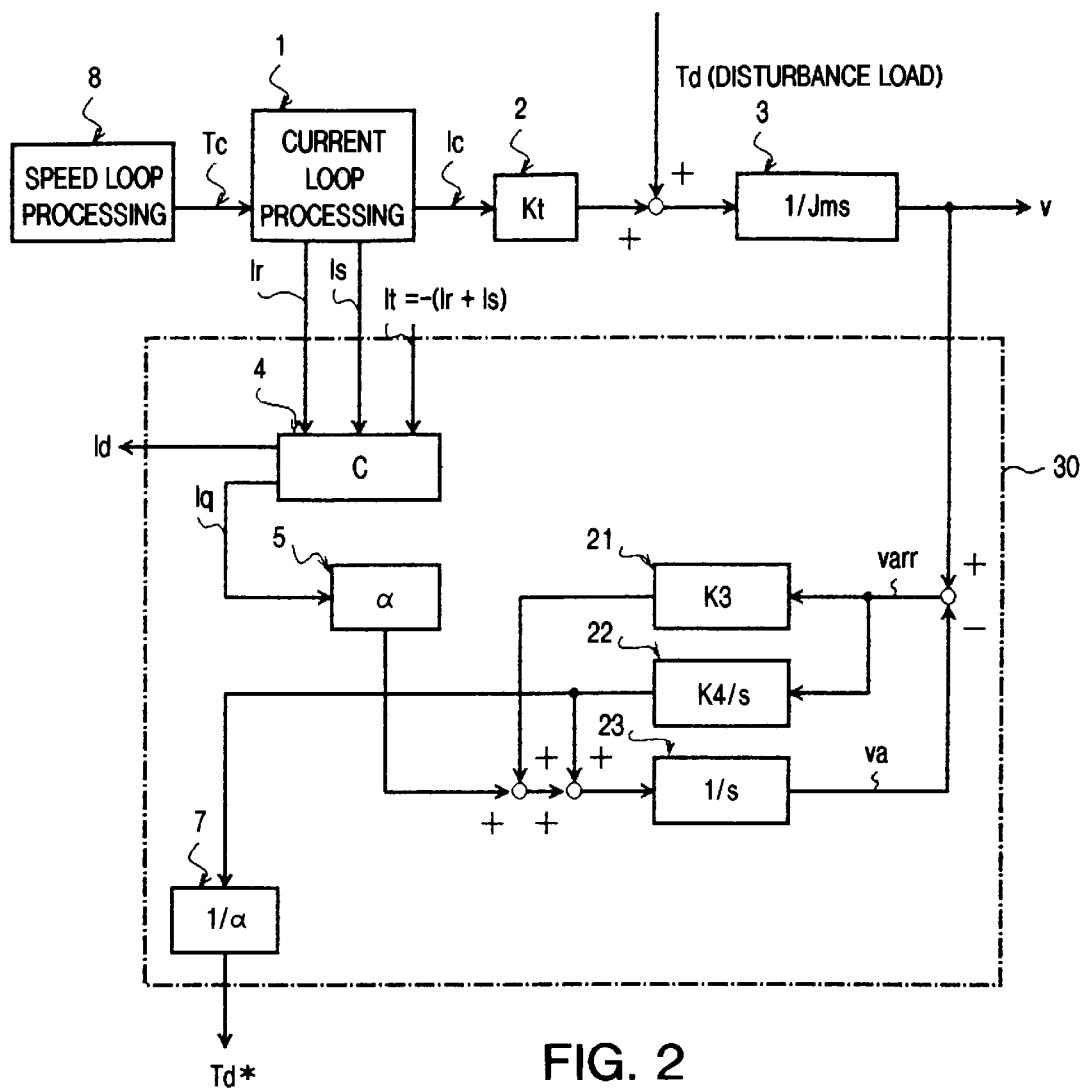
FIG. 2 is a schematic block diagram of a control system provided with a disturbance estimation observer according to a second embodiment of the present invention.

Referring now to FIG. 2, a second embodiment of the present invention will be described. In the second embodiment, the disturbance load estimation observer estimates the disturbance load based on the comparison of speeds.

FIG. 2 is a schematic block diagram illustrating how to estimate disturbance load torque according to the second embodiment of the present invention. In the block diagram of FIG. 2, the estimation observer for estimating the disturbance load torque is applied to a servomotor control system in which position and speed are subjected, respectively, to proportional control and proportional-plus-integral control, as in the case of FIG. 1. As shown in FIG. 2, the control system for a servomotor is represented by a term 8 for speed loop processing, a term 1 for current loop, and terms 2 and 3 for the transfer function of the motor, while an observer 30 for obtaining an estimated disturbance load torque Td* is represented by terms 4, 5, 21, 22, 23 and 7. Symbol Kt of the term 2 is the torque constant of the motor, Jm of the term 3 is the inertia of the motor, and s is the Laplace operator. The term 4 is a DQ conversion term for converting a three-phase alternating current to a two-phase direct current, and the transformation matrix thereof is represented by the determinant C involved in the above expression (1).

The term 5 is a term for multiplying a current value Iq, which is obtained by subjecting the actual current Ic to DC conversion, by a parameter α (value obtained by dividing the motor torque constant Kt by the inertia Jm), K3 and K4 of the terms 21 and 22 are parameters of the disturbance estimation observer, respectively, the term 23 is an integral term, and the term 7 is a term for performing multiplication using a parameter 1/α.

The term 1 for current loop processing receives a torque command (current command) Tc from the term 8 for speed loop processing, and determines an actual current Ic to be supplied to the servomotor. In the estimation method according to the present invention, current values Ir, Is and It of the three-phase current constituting the actual current Ic are converted into current values Iq and Id of two-phase direct current at the DQ conversion term 5. FIG. 2 illustrates the case where the current values Ir and Is are obtained from the outputs of the term 1 for current loop processing, and the remaining current value It is obtained by calculation, but the combination of other two current values may be used to obtain the remaining current value.

According to this embodiment, of the two current values Iq and Id of the two-phase direct current obtained by the determinant C, the q-phase current is used to estimate a speed va. The speed va can be estimated by multiplying the q-phase current Iq by the parameter α and then integrating the resultant product. The parameter α may be a value obtained by dividing the motor torque constant Kt by the inertia Jm.

On the other hand, an actual speed v of the motor can be obtained from a speed detector (not shown) mounted on the motor.

In this servomotor control system, the disturbance estimation observer can be analyzed as follows:

$$(Iq \cdot Kt + Td) \cdot (1/Jms) = v \quad (4)$$

$$\{Iq \cdot (Kt/Jm) + (v-va) \cdot K3 + (v-va) \cdot (K4/s)\} \cdot (1/s) = va \quad (5)$$

From equations (4) and (5), the following equation can be derived.

$$s(v-va) + (v-va) \cdot K3 + (v-va) \cdot (K4/s) = Td/Jm \quad (6)$$

Provided (v−va)=verr, then $$verr = (v-va) = (Td/Jm) \cdot [1/\{s+K3+(K4/s)\}], \quad (7)$$

and from equation (7), the output Td* of the term 7 can be expressed by the following equation (8):

$$Td^* = verr \cdot (K4/s) = (Td/Jm) \cdot \{K4/(s^2 + K3 \cdot s + K4)\} \quad (8)$$

In equation (8), the parameters K3 and K4 are selected so that the pole can be stabilized, and by performing a multiplication using (1/α) at the term 7, it is possible to obtain the estimated disturbance load torque Td*.

In the following, the disturbance load torque estimation method according to the present invention and the conventional estimation method will be compared with each other with reference to the results of experiments.

Figure 3A:
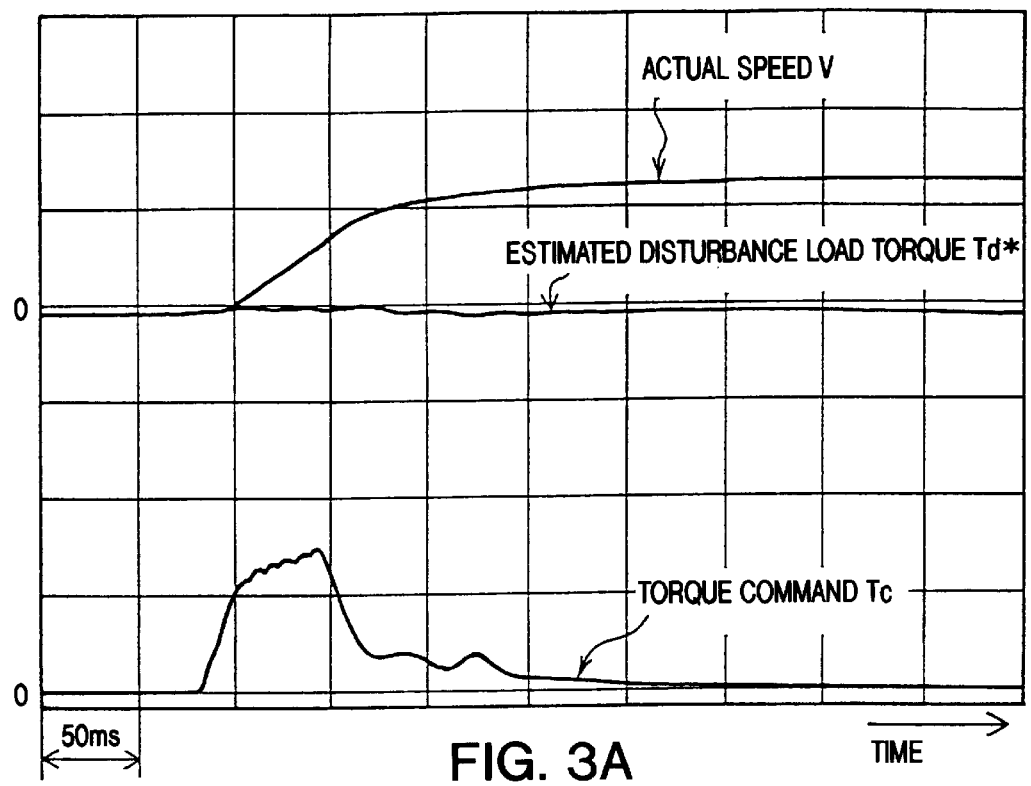
FIGS. 3a and 3b are graphs showing the results of estimation of disturbance load torque by a conventional disturbance load estimation method.
Figure 3B:
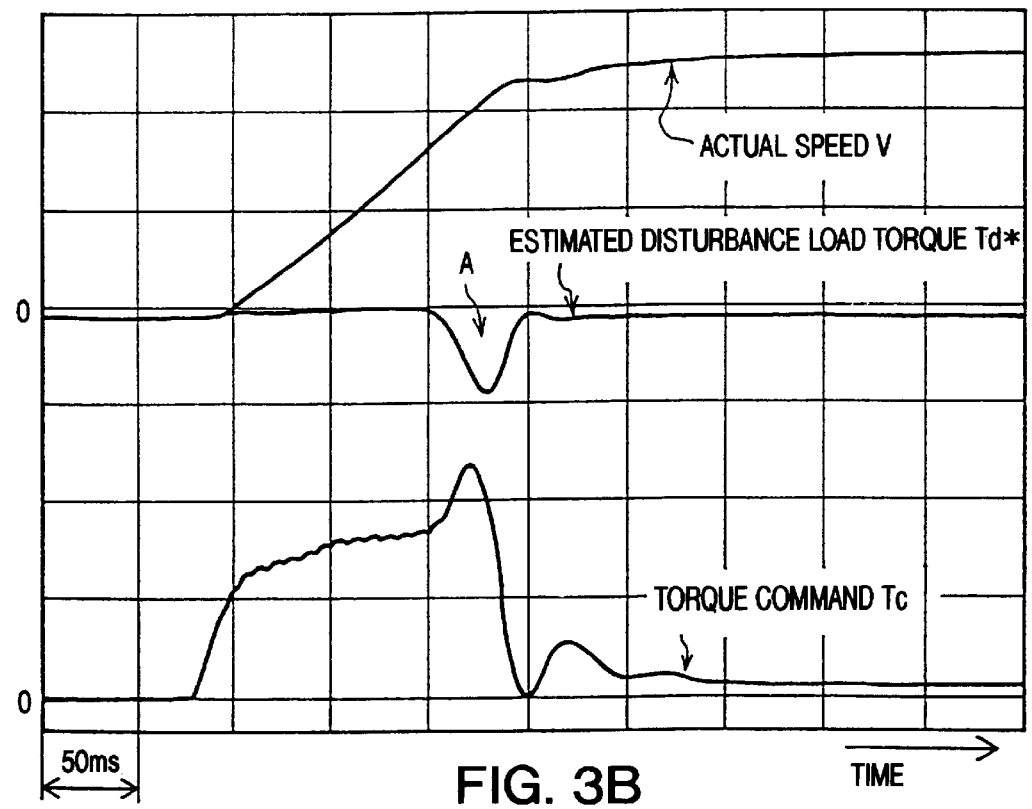
Figure 4:
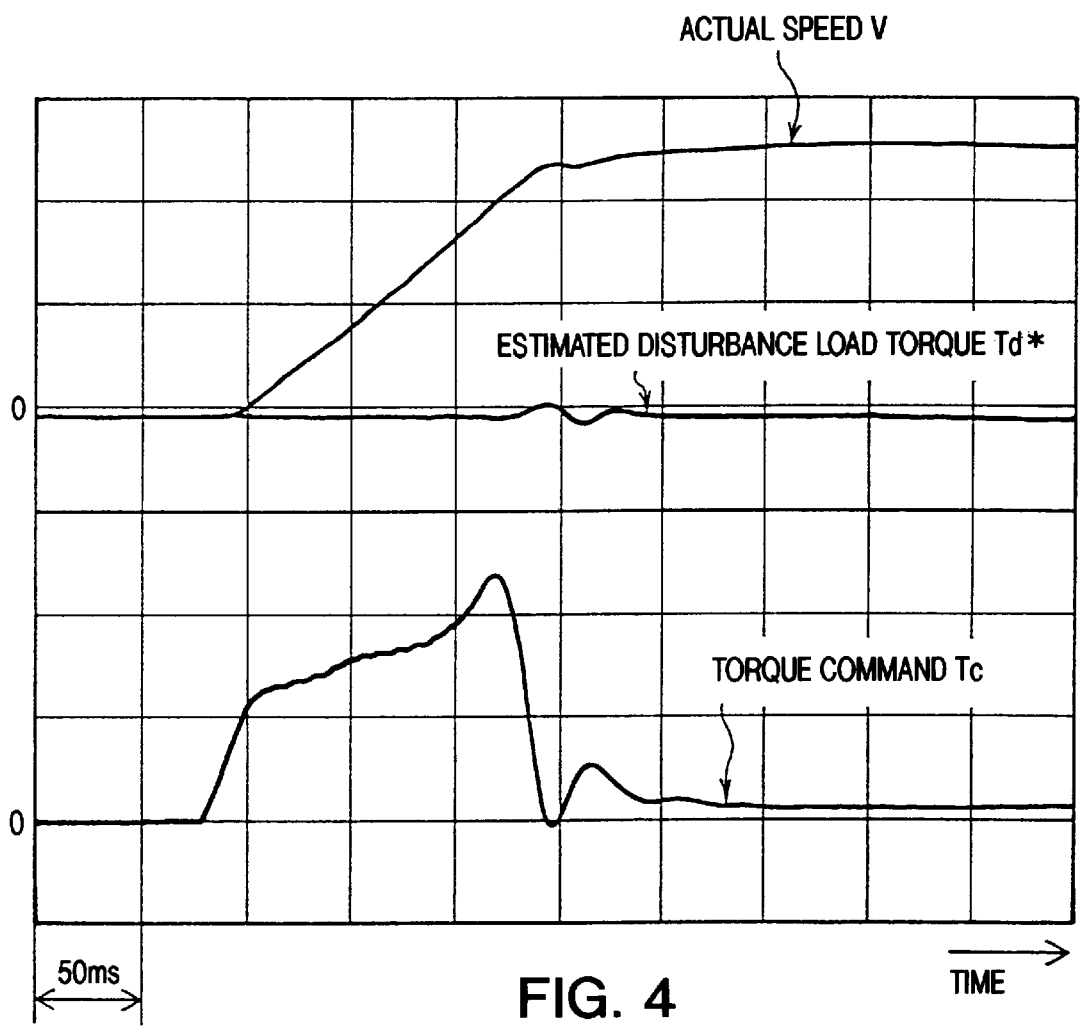
FIG. 4 is a graph showing the result of estimation of the disturbance load torque by the disturbance estimation observer according to the first embodiment of the present invention.
Figure 5A:
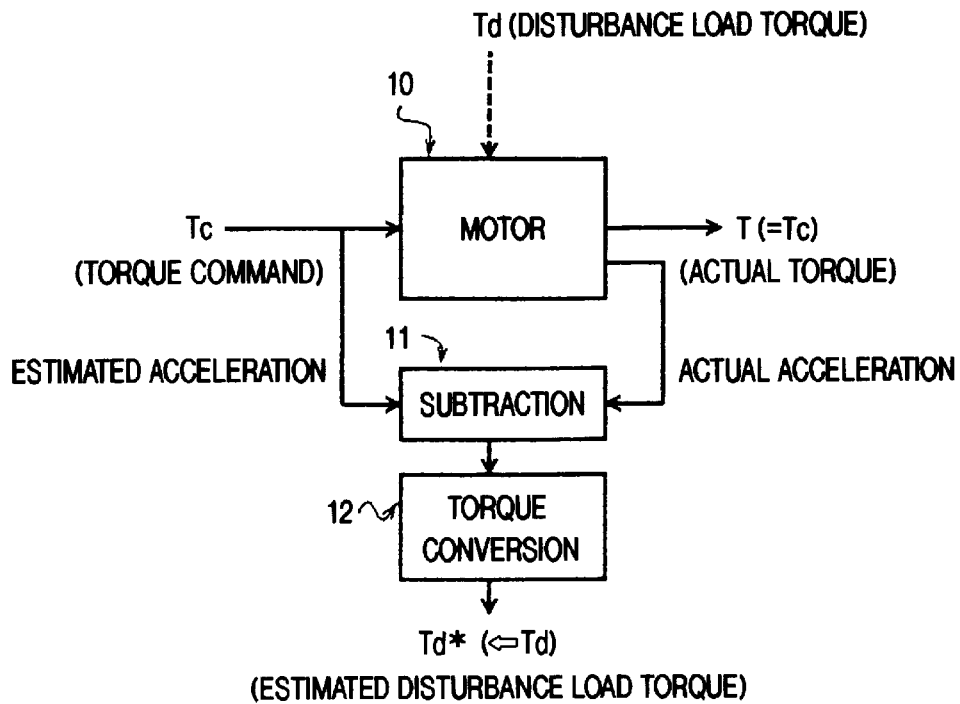
FIGS. 5a and 5b are functional block diagrams illustrating the principles of a conventional disturbance load estimation method.
Figure 5B:
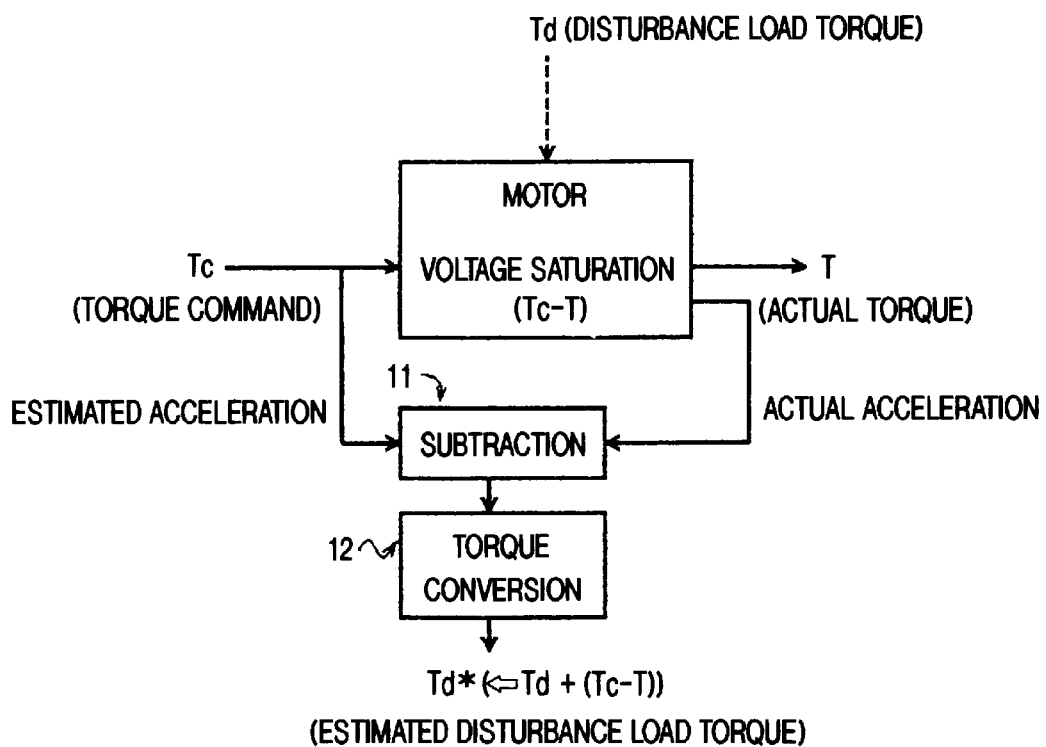
Figure 7:
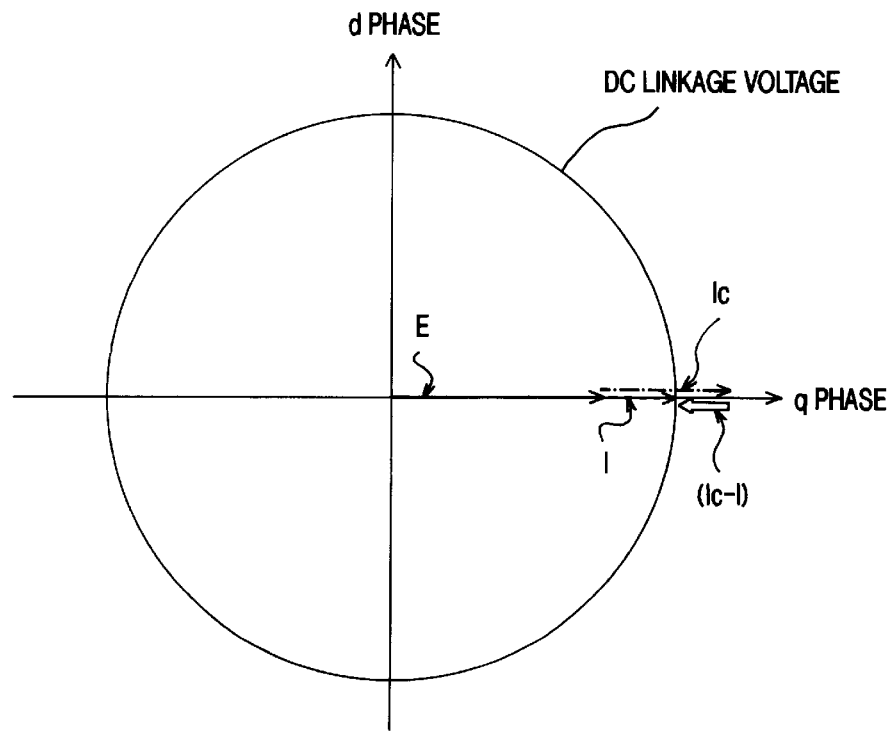
FIG. 7 is a diagram showing a servomotor voltage state during high-speed rotation.

FIGS. 3a and 3b show the results of estimation by the conventional disturbance load torque estimation method, and FIG. 4 shows the result of estimation by the disturbance load torque estimation method according to the present invention. The results of estimation shown in FIGS. 3a, 3b and 4 examples of those obtained under the condition that the disturbance load torque was estimated while the motor alone was accelerated with no disturbance load applied to the motor, and indicate changes with time in the actual motor speed v, the estimated disturbance load torque Td* and the torque command Tc. Therefore, the estimated disturbance load torque Td* should remain unchanged insofar as the disturbance load torque is estimated correctly.

FIG. 3a illustrates the case where the target rotational speed of the motor was set to 900 rpm. In this case, the rotational speed was so low that no voltage saturation occurred. Thus, the estimated disturbance load torque Td* remained substantially the same, and an error attributable to disturbance exerted on the motor and voltage saturation were not observed.

FIG. 3b illustrates the case where the target rotational speed of the motor was set to 2000 rpm. In this case, the rotational speed was high so that voltage saturation occurred. Therefore, a change in the estimated disturbance load torque Td* was observed, as indicated by arrow A in the figure, and this change corresponds to an error in the estimated disturbance load torque Td*.

In contrast, FIG. 4 shows the result of estimation by the disturbance load estimation method according to the first embodiment of the present invention in the case where the target rotational speed of the motor was set to 2000 rpm. In this case, no substantial fluctuation in the estimated disturbance load torque Td* was observed, and also an error attributable to disturbance exerted on the motor or voltage saturation were not be observed. Thus, with the disturbance load torque estimation method of the present invention, the estimation error caused by voltage saturation can be eliminated. As described above, according to the present invention, the external disturbance load exerted on the motor can be estimated with accuracy even when the voltage is saturated.

We claim:

1. A method of estimating a disturbance load exerted on a servomotor of a servo control system in which a current command is determined by speed loop processing and actual current to be supplied to the servomotor is determined by current loop processing of the current command, said method comprising the steps of:

(a) obtaining an effective current component which contributes to a torque generated by the servomotor from the actual current supplied to the servomotor, and converting actual values of three-phase alternating current determined by the current loop processing into values of two-phase direct current through DO conversion; and (b) estimating a disturbance load on the servomotor based on said effective current component.

2. A method of estimating a disturbance load exerted on a servomotor of a servo control system in which a current command is determined by speed loop processing and an actual current to be supplied to the servomotor is determined by current loop processing of the current command, said method comprising the steps of:

(a) obtaining an effective current component which contributes to a torque generated by the servomotor in from the actual current, and converting actual values of three-phase alternating current determined by the current loop processing to values of two-phase direct current through DO conversion;

(b) estimating an acceleration of the servomotor based on the effective current component obtained in said step (a);

(c) obtaining a difference between the estimated acceleration estimated in said step (b) and an actual motor acceleration; and (d) estimating a disturbance load based on the difference of the accelerations obtained in said step (c).

3. A method of estimating a disturbance load exerted on a servomotor of a servo control system in which a current command is determined by speed loop processing and an actual current to be supplied to the servomotor is determined by current loop processing of the current command, said method comprising the steps of:

(a) obtaining an effective current component which contributes to a torque generated by the servomotor in said actual current determined by said current loop processing, and converting actual values of three-phase alternating current determined by the current loop processing to values of two-phase direct current through DO conversion;

(b) estimating a speed of the servomotor based on the effective current component obtained in said step (a);

(c) obtaining a difference between the estimated speed estimated in said step (b) and an actual speed of the servomotor; and (d) estimating a disturbance load based on the difference of the speeds obtained in said step (c).

* * * * *

UNITED STATES PATENT AND TRADEMARK OFFICE
CERTIFICATE OF CORRECTION

PATENT NO.    : 5,936,369
DATED         : August 10, 1999
INVENTOR(S)   : Yasusuke Iwashita et al.

It is certified that error appears in the above-identified patent and that said Letters Patent is hereby corrected as shown below:

Column 8,
Lines 2, 17 and 38, change "DO" to -- DQ --.

Signed and Sealed this

Eleventh Day of March, 2003

JAMES E. ROGAN
*Director of the United States Patent and Trademark Office*